United States Patent [19]

Inui et al.

[11] Patent Number: 4,660,434
[45] Date of Patent: Apr. 28, 1987

[54] APPARATUS FOR PREVENTING GEAR BUZZING IN SHIFTING TO REVERSE

[75] Inventors: Masaki Inui; Yusuke Horiuchi; Shinji Ogawa, all of Toyota, Japan

[73] Assignee: Toyota Jidosha Kabushiki Kaisha, Aichi, Japan

[21] Appl. No.: 778,312

[22] Filed: Sep. 20, 1985

[30] Foreign Application Priority Data

Dec. 28, 1984 [JP] Japan .................. 59-279534

[51] Int. Cl.⁴ .................. B60K 41/26; G05G 5/10
[52] U.S. Cl. .................. 74/477; 74/411.5; 192/4 C
[58] Field of Search .......... 74/411.5, 477, 339; 192/4 A, 4 C

[56] References Cited

U.S. PATENT DOCUMENTS

| 4,221,283 | 9/1980 | Nordkvist et al. | 192/4 C |
| 4,467,665 | 8/1984 | Katayama et al. | 192/4 C X |
| 4,510,818 | 4/1985 | Inui | 192/4 C |
| 4,510,819 | 4/1985 | Inui | 192/4 C |
| 4,527,442 | 7/1985 | Hoffmann et al. | 192/4 C |
| 4,572,020 | 2/1986 | Katayama | 192/4 C X |

FOREIGN PATENT DOCUMENTS 59-75964  5/1984  Japan.
59-79665  5/1984  Japan.

Primary Examiner—Allan D. Herrmann
Attorney, Agent, or Firm—Parkhurst & Oliff

[57] ABSTRACT

An apparatus for preventing gear buzzing in shifting to reverse which is applied to a manual transmission having a plurality of forward gear means provided with synchronous meshing mechanisms and a reverse gear means provided with a selective sliding-gear meshing mechanism driven through a reverse idler gear. An inclined guide surface is formed on a forward shift head, and a projection is formed on a shift-and-select lever. The projection is brought into contact with and slides on the inclined guide surface. A clearance is provided between the forward shift head and an interlocking mechanism so as to permit slight shifting movement of the shift head.

3 Claims, 7 Drawing Figures

APPARATUS FOR PREVENTING GEAR BUZZING IN SHIFTING TO REVERSE

BACKGROUND OF THE INVENTION

This invention relates to an apparatus for preventing gear buzzing in shifting to reverse in a manual transmission.

Conventionally, the reverse gear means in a manual transmission has a selective sliding-gear intermeshing mechanism driven by a reverse idler gear and is not provided with a synchronizing mechanism such as a synchronous meshing mechanism like the forward gear means, because shifting to reverse is as a rule conducted while a vehicle is stationary.

In the above-described conventional transmission, in particular when it is subjected to quick shifting into reverse, the gears clash with each other when the reverse gear meshes with the reverse idler gear because the inertial rotation of the input shaft is still in progress, whereby gear buzzing is generated which gives an unpleasant feeling to the driver and may adversely affect the feeling of shifting. In addition, the clash of gears at such time sometimes causes gear teeth breakage. It might easily be considered that a synchronous meshing mechanism should be provided exclusively for the reverse gear means in order to prevent such gear buzzing. However, such a measure would not be beneficial because it is difficult to secure the space required for providing the synchronous meshing mechanism, costs would be raised, and the weight increased.

On the other hand, Japanese Utility Model Unexamined Publications Nos. 79665/1984 and 75964/1984 disclose apparatuses for preventing the gear buzzing in shifting to reverse without providing the reverse gear means with a synchronous meshing mechanism. Both of these publications disclose a technique of shifting a shift head for the forward gear means which is located adjacent to the reverse gear means by a predetermined amount at the time of shifting to reverse. This shifting of the shift head stops or lowers the inertial rotation of the input shaft by utilizing the synchronous meshing mechanism provided for the forward gear means, thereby preventing the gear buzzing.

However, in the technique disclosed in the above-described Japanese Utility Model Unexamined Publication No. 79665/1984, it is necessary, when shifting the shift head for the forward gear means by a predetermined amount, to move an interlock plate in the selecting direction as well as shifting the gear lever to the reverse gear position, because the inner lever of a shift-and-select lever shaft moves in the selecting direction through the movement of the interlock plate in the selecting direction. Therefore, this structure limits the driver's ability to quickly shift the shift head for the forward gear means by a predetermined amount.

On the other hand, in the technique disclosed in the above-described Japanese Utility Model Unexamined Publication No. 75964/1984, it is necessary, when shifting the shift head for the forward gear means by a predetermined amount, to intermesh the inner lever of the shift-and-select lever shaft with the lock-bolt of the transmission case as well as shifting the gear lever to the reverse gear position, because the inner lever of the shift-and-select lever shaft moves in the selecting direction through the intermeshing with the lock-bolt. Therefore, this structure also limits the ability to quickly shift the shift head for the forward gear means by a predetermined amount.

SUMMARY OF THE INVENTION

Accordingly it is an object of the invention to provide an apparatus for preventing gear buzzing in shifting to reverse especially with respect to quick shifting to reverse without providing a synchronous meshing mechanism for the reverse gear means.

To this end, this invention provides, in a manual transmission having (a) a plurality of forward gear means provided with synchronous meshing mechanisms;
(b) a reverse gear means provided with a selective sliding-gear meshing mechanism driven through a reverse idler gear;
(c) a shift-and-select lever which can selectively mesh with the shift heads of both of the above-mentioned mechanisms; and
(d) an interlocking mechanism which can hold the shift heads which have not been selected in the selection movement of the shift-and-select lever in the standstill state, an apparatus for preventing gear buzzing in shifting to reverse comprising:

(e) an inclined guide surface formed on one of the shift heads for the forward gear means;
(f) a projection provided on the shift-and-select lever so as to come into contact with and slide on the inclined guide surface at the time of shifting to reverse; and
(g) a clearance provided between the shift head for the forward gear means which is provided with the inclined guide surface and the interlocking mechanism so as to permit the shifting movement of the shift head for the forward gear means at the time of shifting to reverse.

The outline of the operation of this invention including the steps of shifting to reverse will be explained below. The shift-and-select lever is first moved for the purpose of selection toward the reverse shift head. At this time the shift-and-select lever intermeshes with the shift head for the reverse gear means and the projection formed on the shift-and-select lever comes into contact with the inclined guide surface formed on the shift head for the forward gear means. The shift-and-select lever is next moved for shifting to reverse. With the shifting operation of the shift-and-select lever, the projection of the shift-and-select lever pushes the inclined guide surface so as to shift the shift head of the relevant forward gear means, whereby the synchronous intermeshing mechanism for the forward gear means is brought into action. As a result, the inertial rotation of the input shaft is stopped or lowered. When the shift-and-select lever is further shifted, the shift head for the relevant forward gear means is shifted by a predetermined amount equivalent to the clearance, whereupon the shift head is stopped by the interlocking mechanism. With a further shifting movement of the shift-and-select lever, the projection slides on the inclined guide surface, whereby the shift-and-select lever returns slightly toward the neutral position and the projection moves off the inclined guide surface. The shifting to reverse is completed by shifting the shift-and-select lever further.

The apparatus for preventing gear buzzing in shifting to reverse according to the invention can advantageously prevent gear buzzing, especially with respect to a quick reverse shifting operation, because intermeshing of the inclined guide surface formed directly on the shift head for the relevant forward gear means with the projection formed directly on the shift-and-select lever is utilized for shifting the shift head for the relevant forward gear means by a predetermined amount.

The above and other objects, features and advantages of the present invention will become clear from the following description of the preferred embodiment thereof, taken in conjunction with the accompanying drawings.

BRIEF DESCRIPTION OF THE DRAWINGS

FIG. 4 shows the embodiment shown in FIG. 1 viewed in the direction indicated by the arrows II—II, upon commencement of reverse shifting;

FIG. 5 shows the embodiment shown in FIG. 1 viewed in the direction indicated by the arrows II—II, after completion of reverse shifting;

FIG. 6 shows a conventional transmission in which the invention can be utilized; and FIG. 7 shows a conventional interlocking mechanism which can be utilized with the invention.

DESCRIPTION OF THE PREFERRED EMBODIMENT

Figure 1:
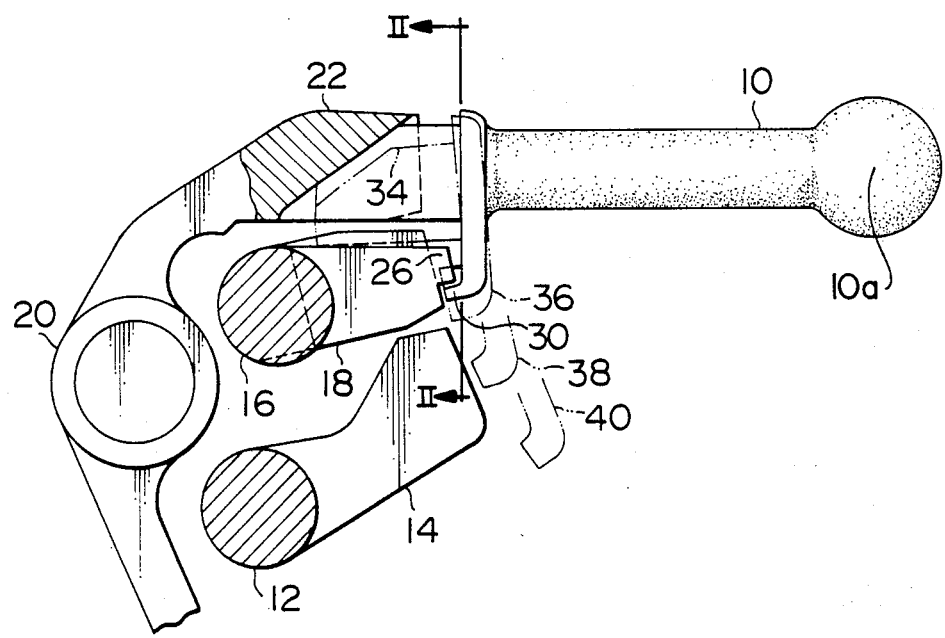
FIG. 1 is an elevational view of an embodiment of an apparatus for preventing gear buzzing in shifting to reverse according to the invention.
Figure 2:
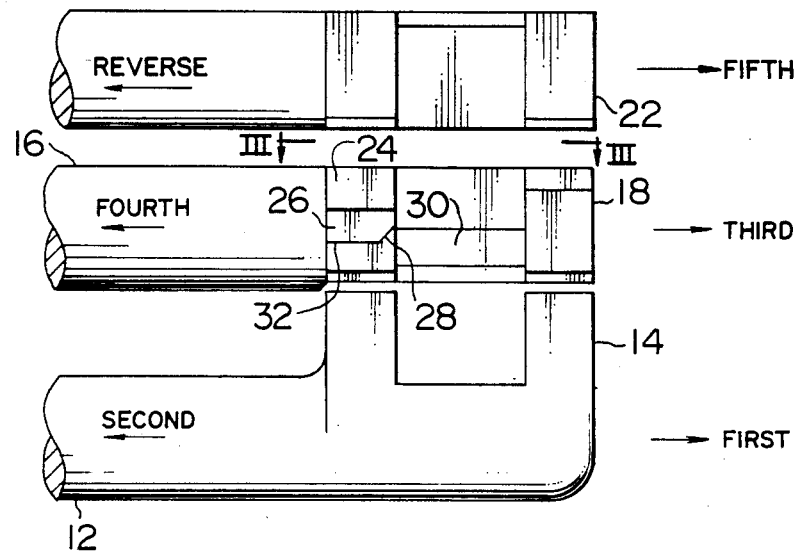
FIG. 2 shows the embodiment shown in FIG. 1 viewed in the direction indicated by the arrows II—II, when shift-and-select lever 10 has been moved to a reverse selecting position.
Figure 3:
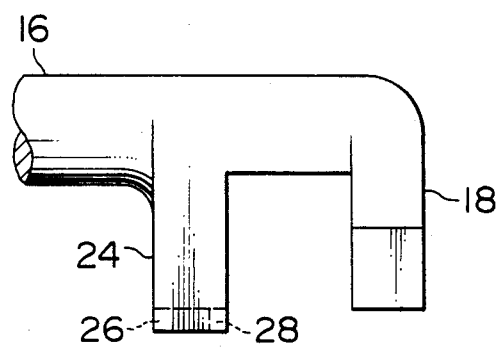
FIG. 3 shows the embodiment shown in FIG. 2 viewed in the direction indicated by the arrows III—III.

An embodiment of the invention shown in FIGS. 1 to 5 is provided in a manual transmission for five forward speeds and one reverse, such as the transmission shown and described in U.S. Pat. No. 4,467,665. A shift-and-select lever 10, pivotable about and axially movable with respect to axis 10a, is so designed as to be intermeshable with a shift head 14 for a first-and-second shift fork shaft 12, a shift head 18 of a third-and-fourth shift fork shaft 16, and a shift head 22 of a fifth-and-reverse shift fork shaft 20. With reference to FIG. 6, the first- to fifth-speed gear means 111-115 are provided with synchronous meshing mechanisms 116-118 and the reverse gear means 119 is provided with a selective sliding-gear meshing mechanism (not shown) driven through a reverse idler gear 120.

A projection 26 is provided on the arm 24 which is located at the reverse shifting side of the shift head 18, and an inclined guide surface 28 is formed on one of the surfaces of the projection 26 facing the selecting direction. The shift-and-select lever 10 is provided with a projection 30 which projects into the selecting direction. The projection 30 is so formed as to overlap the projection 26 of the shift head 18 for the third- and fourth-speeds in the shifting direction only at the time of reverse selection of the shift-and-select lever 10.

The operation of the embodiment at the time of reverse shifting of the manual transmission will next be explained. The shift-and-select lever 10 is first moved in the reverse selecting direction (see FIG. 2), whereby the lever 10 is brought into contact with the inclined guide surface 28, which also serves as a selection stopper surface, of the shift head 18 of the third-and-fourth shift fork shaft 16. The shift-and-select lever 10 is thereafter shifted in the reverse shifting direction, as shown in FIG. 4. At this time the projection 30 of the shift-and-select lever 10 overlaps the projection 26 of the third-and-fourth shift head 18 in the shifting direction, as is shown in FIG. 1. The projection 30 comes into contact with the inclined guide surface 28 of the projection 26 and pushes the inclined guide surface 28 in the reverse shifting direction with the shifting movement of the shift-and-select lever 10. Therefore the third-and-fourth shift fork shaft 16 is shifted in the direction of the fourth speed, whereby the synchronous meshing mechanism for the fourth speed is brought into action. As a result, the inertial rotation of the input shaft is stopped or lowered. On the other hand, the third-and-fourth shift head 18 is stopped by an interlocking mechanism 50 (FIG. 7), such as the one shown and described in U.S. Pat. No. 4,467,665, when the shift head 18 has moved in the direction of the fourth speed by a predetermined amount, and does not reach the fourth speed shifting position. A clearance g (FIG. 7) formed between the shift head 18 for the third- and fourth-speeds and the interlocking mechanism enables the third-and-fourth shift head 18 to shift by a predetermined amount.

When the shift-and-select lever 10 is further moved to the reverse shifting direction after the third-and-fourth shifting head 18 is stopped by the interlocking mechanism, the projection 30 of the lever 10 slides on the inclined guide surface 28 of the projection 26 of the third-and-fourth shift head 18. The shift-and-select lever 10 thereby returns slightly in the direction of the neutral position, and finally the projection 30 moves off the inclined guide surface 28 in the reverse shifting direction along the side surface 32 of the projection 26. In this way shifting to reverse is completed (see FIG. 5).

When the reverse shift is released, since the shift-and-select lever 10 has been returned slightly in the direction of the neutral position, the lever 10 and the projection 30 keep the positions 34 and 36, respectively, in the selecting direction, thereby preventing the projection 30 from colliding against the projection 26 of the third-and-fourth shift head 18.

When the shift-and-select lever 10 is in the neutral position or meshes with the third-and-fourth shift head 18, the projection 30 is at the position 38, while when the shift-and-select lever 10 intermeshes with the first-and-second shift head 14, the projection 30 is at the position 40. Accordingly, the projection 30 does not have any influence upon the transmission except at the time of reverse shifting.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. In a manual transmission having
 a plurality of forward gear means provided with synchronous meshing mechanisms,
 a reverse gear means driven through a reverse idler gear,
 a shift-and-select lever capable of selectively meshing with shift heads of both said plurality of forward gear means and said reverse gear means, and
 an interlocking mechanism capable of holding said shift heads which have not been selected in the selection movement of said shift-and-select lever in a standstill state;

an apparatus for preventing gear buzzing in shifting to reverse comprising:

an inclined guide surface provided on a projection formed integrally with one of the shift heads of said plurality of forward gear means;

a projection provided on said shift-and-select lever so as to come into contact with and slide on said inclined guide surface at the time of shifting to reverse; and a clearance provided between said one shift head which is provided with said inclined guide surface and said interlocking mechanism so as to permit shifting movement of said one shift head at the time of shifting to reverse.

2. An apparatus for preventing gear buzzing in shifting to reverse according to claim 1, in which said one shift head is located adjacent to the shift head of said reverse gear means.

3. An apparatus for preventing gear buzzing in shifting to reverse according to claim 2, in which a second projection is formed on an arm which is located at a reverse shifting side of said one shift head, and said inclined guide surface is provided on a surface of said second projection facing a selecting direction.

* * * * *